United States Patent [19]

Thornton

[11] Patent Number: 5,027,002

[45] Date of Patent: Jun. 25, 1991

[54] REDUNDANT POWER BUS ARRANGEMENT FOR ELECTRONIC CIRCUITS

[75] Inventor: Roger D. Thornton, Union Township, Auglaize County, Ohio

[73] Assignee: Westinghouse Electric Corp., Pittsburgh, Pa.

[21] Appl. No.: 417,168

[22] Filed: Oct. 4, 1989

[51] Int. Cl.[5] .......................... H02J 1/10; H02J 1/14; G05F 1/577

[52] U.S. Cl. .......................... 307/35; 307/19; 307/31; 307/39; 307/219; 307/296.8; 307/568; 323/278

[58] Field of Search .......................... 307/11, 12, 18, 19, 307/23, 25, 29, 31, 33–35, 38, 39, 64–66, 219, 441, 568, 303.1, 296.1, 296.2, 296.5, 296.8; 323/277, 278; 361/18; 364/131, 184, 187

[56] References Cited

U.S. PATENT DOCUMENTS 4,085,334 4/1978 Shinohara et al. .................. 307/11
4,156,200 5/1979 Gomez .................................. 328/61
4,227,098 10/1980 Brown et al. ....................... 307/311
4,404,473 9/1983 Fox ..................................... 307/125
4,724,374 2/1988 Beg ..................................... 323/272

*Primary Examiner*—A. D. Pellinen
*Assistant Examiner*—David Osborn
*Attorney, Agent, or Firm*—R. P. Lenart

[57] ABSTRACT

A redundant power bus arrangement for electronic circuits controls the application of voltage from a power source to an active circuit card and a standby circuit card. Current limited switches are used to connect the power source to the active or standby circuits. A switch control circuit controls the conductive state of the current limited switches in response to a control signal generated by at least one of the controlled circuits. The maximum current permitted by each of the current limited switches is less than the maximum output current rating of the power source, thereby preventing a short on a power bus within one of the controlled circuits from affecting the voltage available for the other controlled circuit.

9 Claims, 4 Drawing Sheets

REDUNDANT POWER BUS ARRANGEMENT FOR ELECTRONIC CIRCUITS

BACKGROUND OF THE INVENTION

This invention relates to power bus switching arrangements for electronic circuits and, more particularly, to such arrangements for use with circuits having redundant circuit functions.

A desire for the highest reliability in electronic equipment used for certain critical applications, such as in aircraft electronics, has resulted in the increasing use of redundancy in the design of these products. This redundancy is applied to two general areas within aircraft power system electronic equipment: the internal power supplies, and circuits which perform specific functions. Either or both of these areas can be duplicated or "backed up" by additional circuits or components inside the equipment.

There are two well-known methods of using dual redundant power supplies. The first method uses diodes to OR the outputs of the two supplies, while the second uses sophisticated load-sharing controls with suitable isolation to control the operation of the supplies. The former method provides adequate isolation with no loss of bus voltage if the output of one supply shorts. Also, the supplies used in such designs can be relatively simple as they require no load sharing controls. However, this method may be undesirable for applications which require low voltage levels with tight tolerances, such as those required by many integrated circuit families. The diode drop inherent in this approach typically uses up or exceeds the available tolerance band of the supplied voltage. The latter method is acceptable in such situations since it provides a tightly regulated voltage in the center of the tolerance band, but results in increased sophistication and decreased reliability of the supplies due to the load-sharing and output isolation requirements.

Circuit function redundancy can be implemented at various levels in the equipment including the component, circuit, and printing wiring board or card level. At the circuit card level, redundancy is typically of two types: active or standby. Active redundancy implies that both cards are powered simultaneously and, given the same inputs, provide the same outputs to some controlled device. The controlled device is assumed to be sophisticated enough to discern the difference between signals from a good card and a failed card. Often, more than two such cards are used to support a majority vote function in the controlled device. In addition to the added complexity of combining the outputs in such a way as to ignore a failed circuit card, another drawback exists in the reliability gained in having a redundant circuit card. By powering the cards together, the net gain in overall reliability is less than that realized by the standby redundant approach. Higher net increases in reliability can be achieved in the active approach if the number of redundant cards is increased. However, that may be unacceptable in applications where an increase in weight, size or complexity is undesirable.

Standby redundancy represents the largest net gain in overall reliability with the least increase in complexity. This method implies that the backup or redundant circuit card is not powered until it is needed (due to a failure in the primary or active card) by the equipment. Such designs require a switch to turn the active (failed) card off and the standby card on. The trade-off in such designs involves the reliability of the circuit card versus the reliability of the switch and its controls.

A typical application involving both dual redundant power supplies and dual redundant circuit cards may include diode-connected power supplies in combination with active and standby circuit cards. The power to the redundant circuit cards is controlled by sensing logic which, upon detecting a failure in the active circuit card, transfers the control power to the standby card via a relay. Some type of start-up logic would be required and the system must be capable of transferring power to the standby card should the active card short out the power bus. The switching relay would be large and of somewhat low reliability, given a pole for each voltage bus switched. Regardless of how the power transfer is accomplished, a major concern with this approach is the fact that no matter where the isolation diodes are located, a short on the active card (or the standby card, if activated) power bus will cause an interruption of voltage to all other cards on the redundant power supply bus.

It is therefore desirable to devise a redundant power bus arrangement which eliminates the need for the large and somewhat low reliability relay and also addresses the shorted common bus problem so that a shorted bus within one of the controlled circuit cards does not cause a loss of voltage to all of the other circuit cards on the redundant power supply bus.

SUMMARY OF THE INVENTION

A redundant power bus arrangement for electronic circuits constructed in accordance with this invention includes an active circuit to be controlled, a standby circuit to be controlled, and a power source for providing electric power to those circuits. A current limiting switch is connected between each of those circuits and the power source. A switch control circuit controls the conductive state of the current limiting switches in response to a control signal generated by at least one of the circuits to be controlled. The switches limit current to a maximum value which is less than the maximum output current rating of the power source so that a short on the internal power bus of one of the controlled circuits does not prevent the application of voltage to the other controlled circuit.

In a typical application, low power linear regulators would provide the regulated voltage power to each controlled circuit individually. The use of a remotely controlled on/off switch with current limiting provides a reliable and compact means of transferring power from one controlled circuit to the other. Various options can be supported by this arrangement. For example, a low power DC to DC converter can be located on the circuit cards containing the controlled circuits and a somewhat higher voltage can be supplied by the main power bus to all of the circuit cards, or the current limited switch can be inserted into each of several low voltage busses as they enter the controlled circuit cards.

The current limit function provides bus isolation preventing a shorted circuit card from pulling the entire main voltage bus down. A side benefit of the current limit feature is that, in the event of a short on a controlled circuit card, the failed component or circuit will not receive enough current to overheat and cause secondary damage or fire. Trade-offs inherent in this invention include desired power ratings, possible snubber circuit requirements, and thermal management in the current limited switch, the complexity of the switch versus the controlled circuits, and other influences on power bus configuration. The preferred embodiments of this invention provide switches which fulfill requirements for typical circuit applications.

DESCRIPTION OF THE PREFERRED EMBODIMENTS

Figure 1:
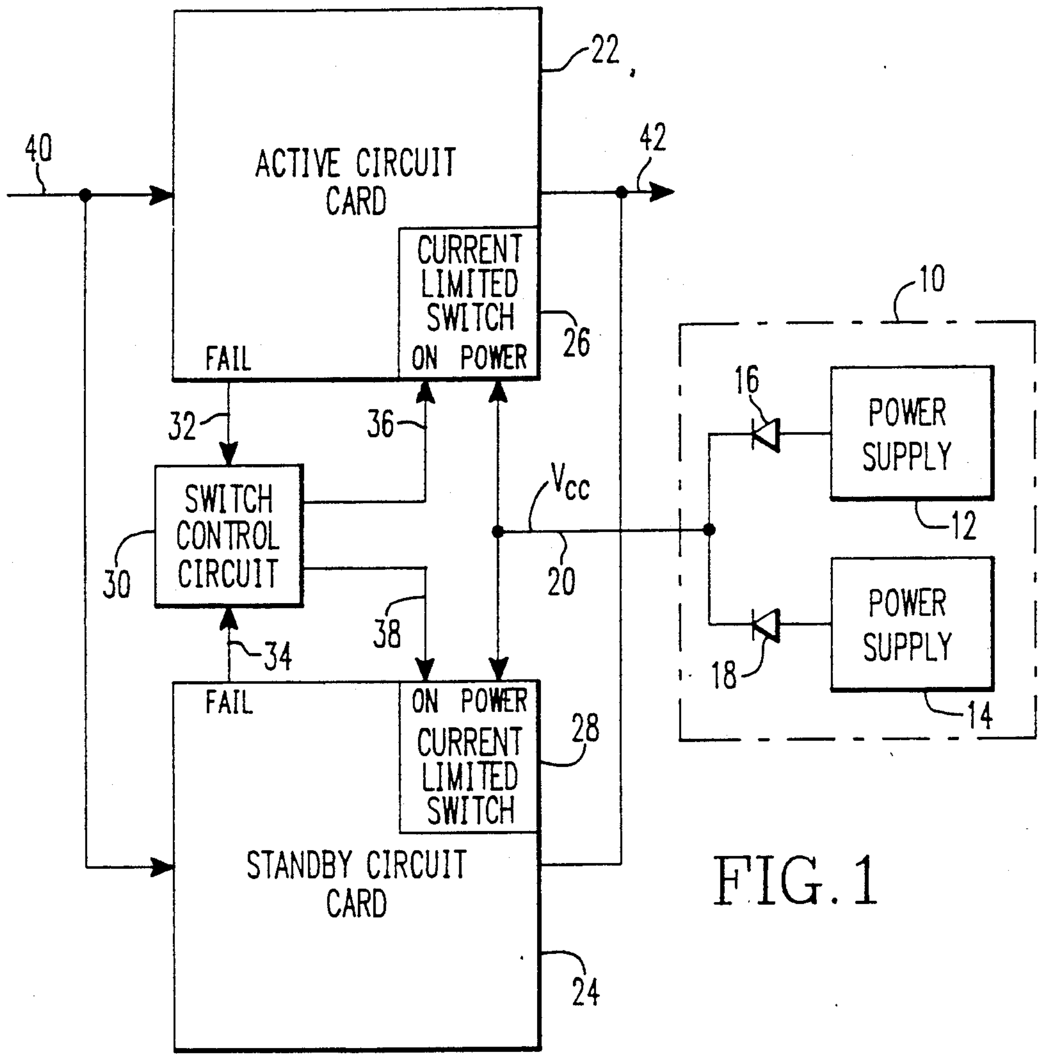
FIG. 1 is a block diagram of a redundant bus power arrangement constructed in accordance with the present invention.

Referrinq to the drawings, FIG. 1 is a block diagram of a redundant power bus arrangement constructed in accordance with the present invention. A power source 10 comprising redundant power supplies 12 and 14 which are connected by way of diodes 16 and 18, respectively, to the main control power bus 20, is used to provide the control voltage $V_{cc}$ to both an active circuit card 22 and a standby circuit card 24. The circuit cards may contain any of a wide variety of electronic circuits such as control logic and contactor drive circuits for use in aircraft electrical power systems. A first current limited power switch 26 is located on the active circuit card 22 and a second current limited power switch 28 is located on the standby circuit card 24. A switch control 30 receives status signals on lines 32 and 34 which indicate the operational status of the active and standby cards, respectively. The switch control circuit then controls the conduction state of the current limited switches in accordance with these status signals by way of lines 36 and 38. In this embodiment, both the active and standby cards receive logic input signals on line 40 and produce logic output signals on line 42. In FIGS. 2, 3, 4 and 5, the dotted arrows connected to lines 36 and 38 indicate optional connections to additional poles.

Probability analysis shows that a significant increase in overall reliability begins to appear as the failure rate of the current limited switch and its controls drops to less than half of the failure rate of the controlled circuit. The reliability improvement begins to level off as the switch failure rate falls below 10% of that of the switched circuit. This leads to the conclusion that a simple and reliable switch is better and that such a switch will be acceptable over a wider variety of switched circuits and circuit cards. The remainder of the Figures illustrate a simple and reliable switch with the desired on/off control features and current limiting for a variety of applications.

Figure 2:
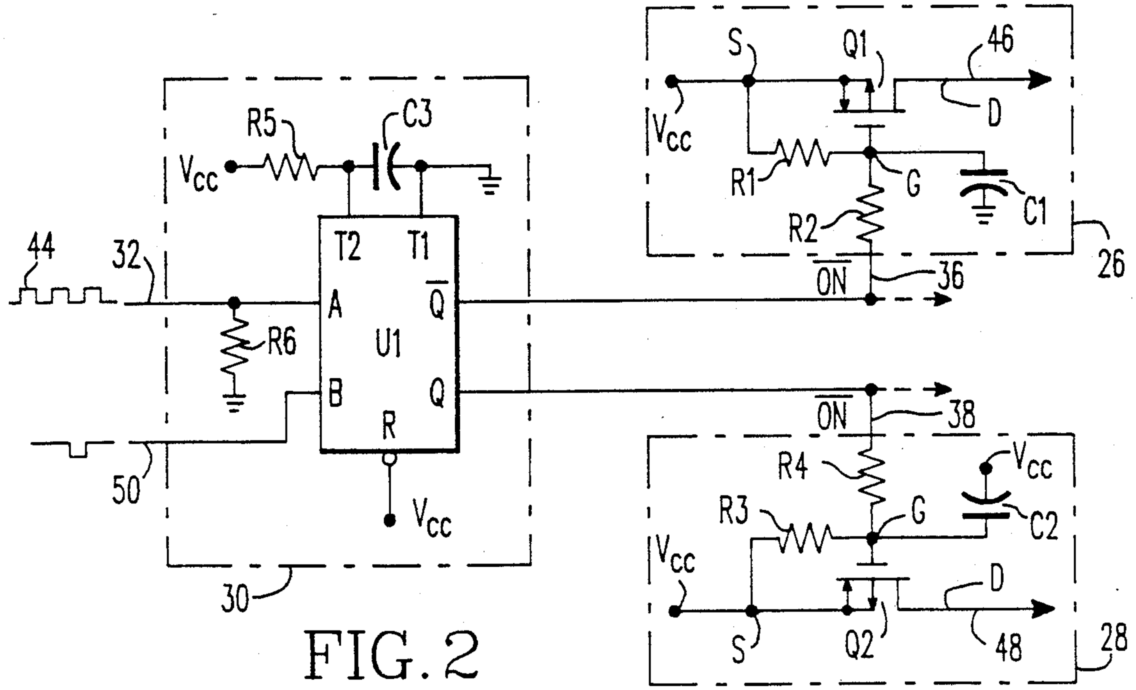
FIG. 2 is a schematic diagram of one embodiment of the invention which provides a break before make switching function.

For clarity, similar item designations have been used for similar components throughout all of the Figures. FIG. 2 is a schematic diagram of a switching arrangement for use in the system of FIG. 1 wherein break before make operation of the switch is required. Current limited switch 26 is designed to switch a positive voltage $V_{cc}$ to the active circuit card power bus 46 and comprises resistors R1 and R2, capacitor C1 and a P-type field effect transistor (FET) Q1. Similarly, current limited switch 28 comprises resistors R3 and R4, capacitor C2 and P-type FET Q2. Control for the operational status of the current limited switches is provided by a single monostable one-shot circuit U1 with timing components R5 and C3. Resistor R4 allows an open circuit failure to be detected by preventing noise from triggering the one-shot circuit. The start-up time and frequency of the active circuit card in this example dictate the values of the timing components R5 and C3. Capacitor C1 in the active card power bus switch allows FET Q1 to initially turn on at power up so that the active card can produce a pulse train 44, indicative of normal operation of the active card, to clock the one-shot circuit. In an alternative embodiment, this pulse train could be replaced by a simple logic level shift and the control one shot could be replaced by combinational logic. However, the use of a pulse train provides a better failure signal as a stuck output can be detected regardless of the signal level. Capacitor C2 in the standby card switch pole is connected so as to inhibit the standby card power bus 48 from energizing at power up.

A reset signal on line 50 turns the standby circuit card off and the active circuit card back on if, for instance, the active card were replaced while the equipment was in service. Current limiting is provided by controlling the gate to source voltage of the FETs Q1 or Q2 and thereby maintaining a relatively constant transistor current regardless of the load on the drain D of the transistor. Resistors R1 and R2, and R3 and R4, set the gate to source voltage of transistors Q1 and Q2, respectively. The circuit of FIG. 2 represents a make before break double-throw switch. The number of switching poles controlled by a single one-shot circuit is optional and limited only by the micro-circuits output drive capability.

Figure 3:
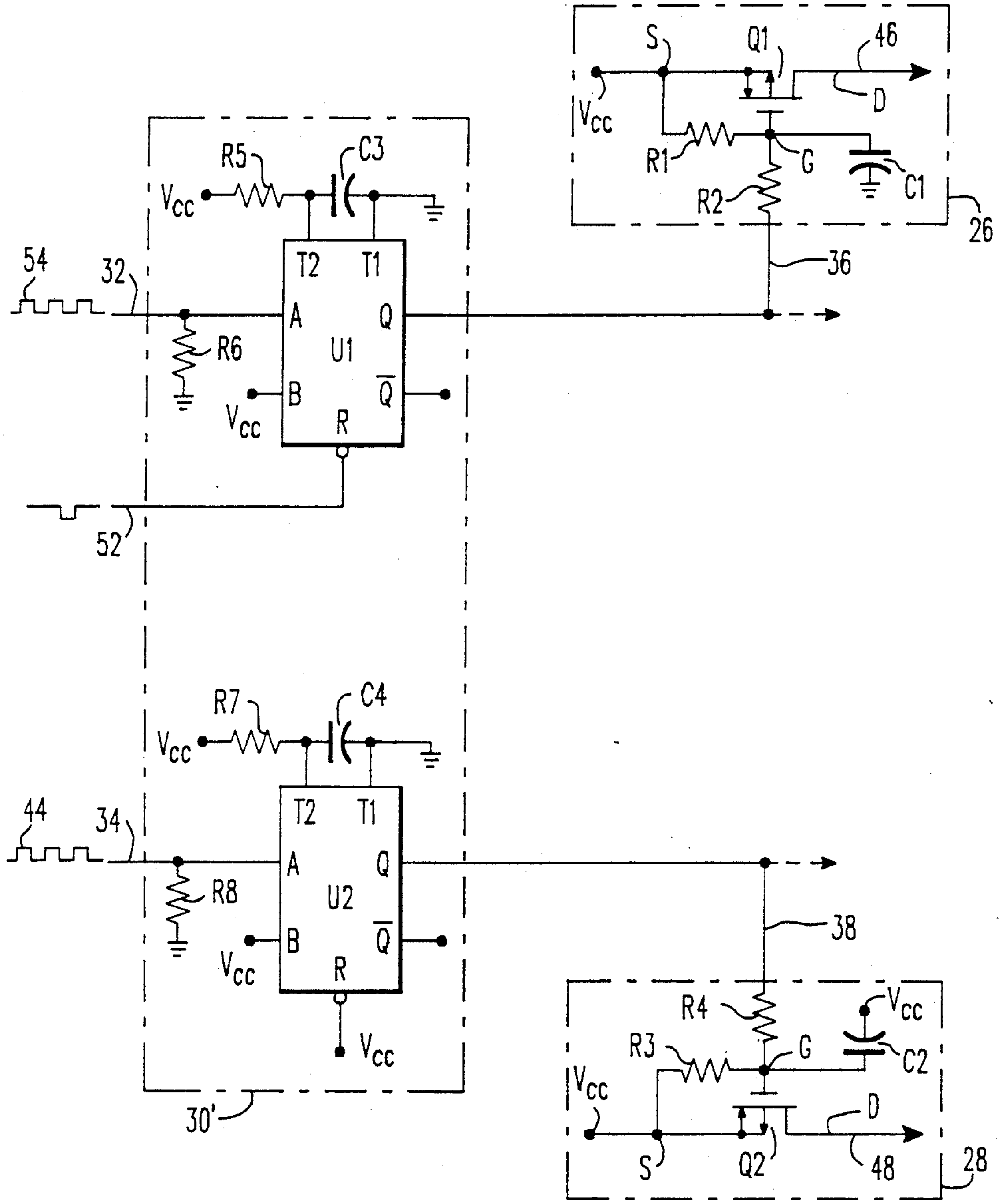
FIG. 3 is a schematic diagram of a second embodiment of the invention which provides a make before break switching function.
Figure 4:
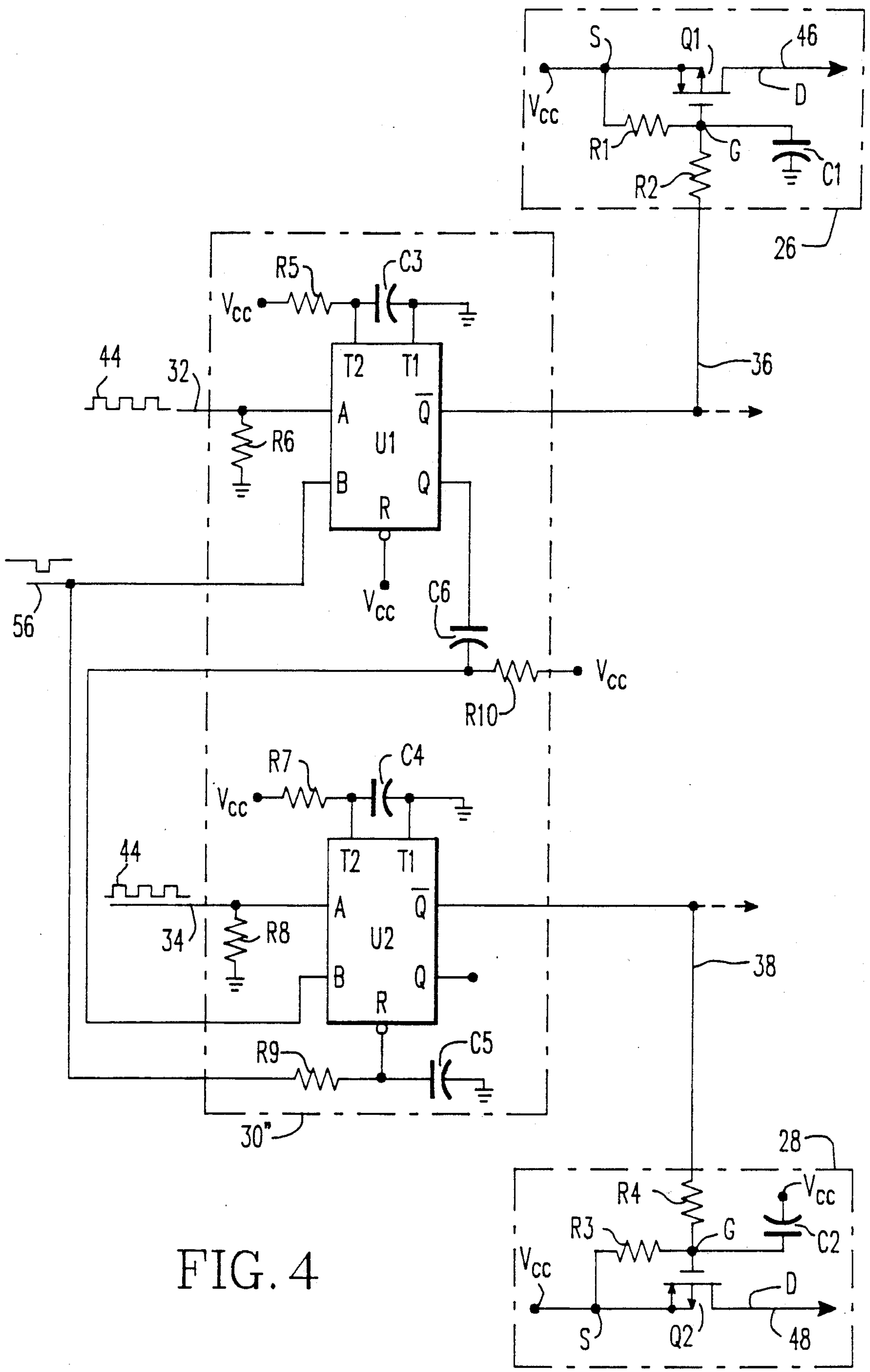
FIG. 4 is a schematic diagram of another embodiment of the invention which provides a center off switching function.

The schematic diagrams of FIGS. 3 and 4 illustrate variations in the switch control circuit 30. The circuit of FIG. 3 performs a make before break function by adding an additional one-shot circuit U2 to the switch control circuit 30'. Timing components R7 and C4 and an input resistor R8 are added to one shot U2 so that the same timing constraints mentioned with respect to FIG. 2 apply. The circuit of FIG. 3 is reset by providing a reset signal to the reset input of one shot U1 via line 52. In operation, a logic zero on line 36 keeps transistor Q1 on and Q1 remains on while Q2 is turned on thereby enabling the standby circuit card to produce pulse train 54. After one RC time constant determined by the values of resistor R5 and C3, Q1 turns off.

A center off switch function is performed by the circuit illustrated in the schematic diagram of FIG. 4. That circuit allows the power buses 46 to be turned off prior to turning on power bus 48. The active card power bus can be re-energized by a reset pulse on line 56. The same timing constraints as mentioned for the previous circuits also apply to the circuit of FIG. 4.

Figure 5:
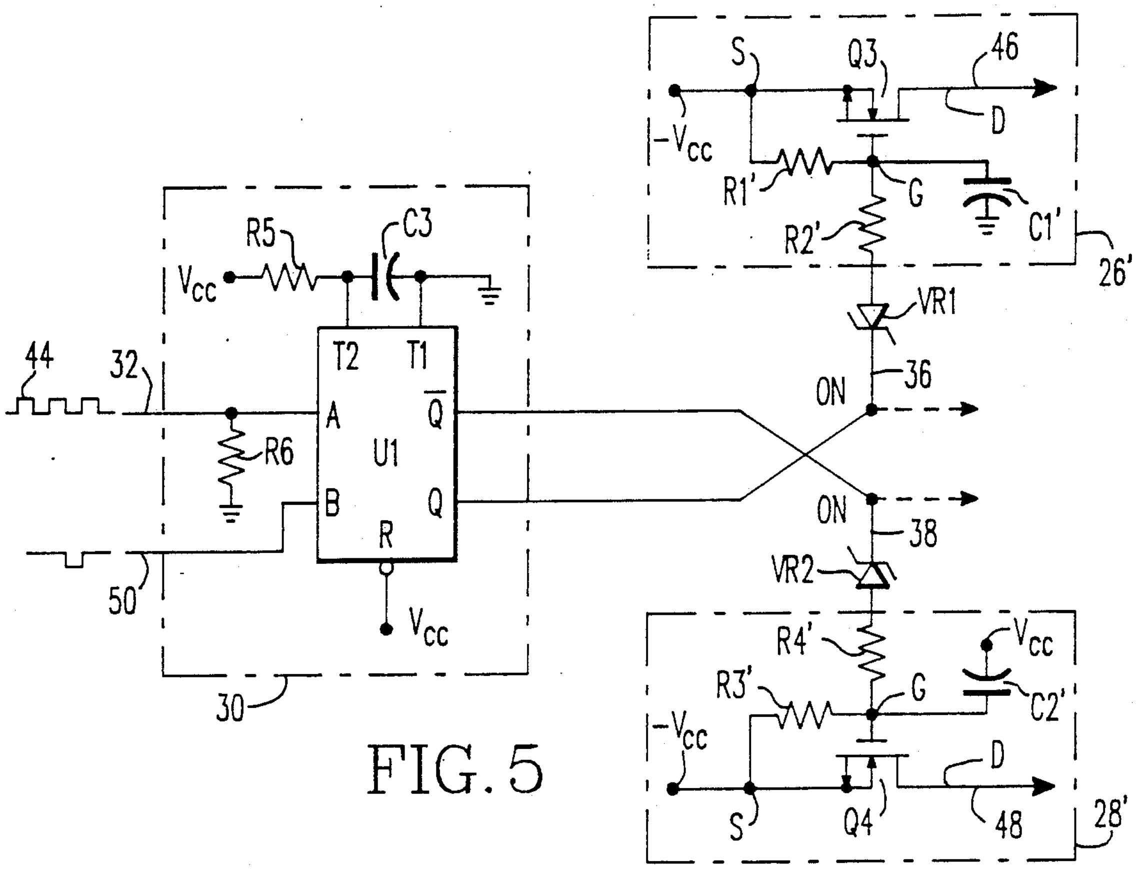
FIG. 5 is a schematic diagram of yet another embodiment of the invention adapted for use in negative voltage systems.

For situations requiring negative voltage busses, N type FETs Q3 and Q4 can be used as illustrated in the circuit of FIG. 5. Zener diodes VR1 and VR2 provide a level shifting function to prevent the turn-on of FET Q3 when the output Q of one shot U1 is zero. The zener diode voltage of diodes VRI and VR2 should be about 1.5 times $V_{cc}$.

Figure 6:
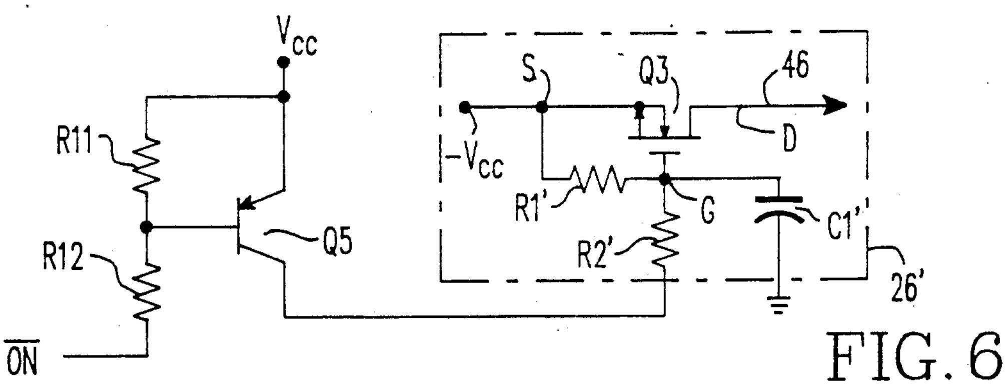
FIG. 6 is a schematic diagram of an alternative circuit design for use in systems with both positive and negative voltages controlled by a single control ($\overline{ON}$) signal.
Figure 7:
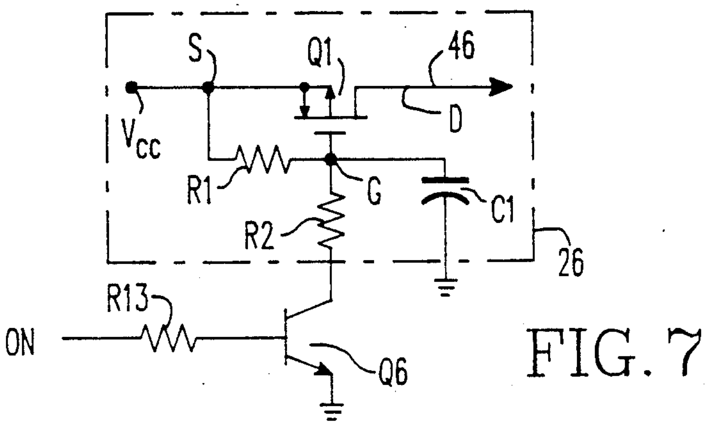
FIG. 7 is a schematic diagram of a modification to the current limited switch for use with higher bus voltages higher than $V_{cc}$ of the control logic.

An alternative approach for negative bus voltages is illustrated in the circuit of FIG. 6. By adding bi-polar transistor Q5 and resistors R11 and R12, the embodiment of FIG. 6 eliminates the need for the reversal of the Q and $\overline{Q}$ outputs of the one shot as required by FIG. 5 and avoids a possibly undesirable situation which may result from low zener diode currents associated with the circuit of FIG. 5.

In certain applications, the main bus voltage may be greater than the local bus voltages of the switch control circuits. This situation can be handled by the circuit of FIG. 7 which includes an NPN bipolar transistor Q6 and a resistor R13 as shown. This modification requires the reversing of the Q and $\overline{Q}$ outputs from the control logic as in FIG. 5, but represents no great increase in complexity since variations in the basic FET based switch poles can be controlled by a single one-shot logic circuit. The switch configurations illustrated in FIGS. 2 through 7 provide on/off control as well as current limiting required by the present invention. The circuits are simple, reliable, and compact, and they allow maximum flexibility in the design of internal power busses of reliable electronic equipment.

Power bus arrangements for electronic equipment constructed in accordance with this invention provide bus isolation to prevent a short in a single circuit card bus from affecting the voltage available to other circuit cards. The required switching function is provided without the size, weight and reliability problems associated with multiple pole mechanical relays. By eliminating the need for load sharing control circuits in the power source or complex isolation circuits to protect against single point failures, the circuits of this invention allow the use of less complex power supplies and equipment requiring dual redundant power supplies. The current limiting features of the switching circuit provide inherent protection from secondary damage due to an initial shorted voltage bus on a controlled circuit card. Since the controlled circuit cards are unpowered upon failure, in-service removal and replacement of failed circuit cards is possible.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:

1. A redundant power bus arrangement for electronic circuits comprising:
- an active circuit to be controlled;
- a standby circuit to be controlled;
- a power source;
- a first current limited switch for connecting said power source to said active circuit;
- a second current limited switch for connecting said power source to said standby circuit;
- wherein the maximum current permitted by each of said first and second current limited switches is less than the maximum output current rating of said power source; and
- a switch control circuit for controlling the conductive state of said first and second current limited switches in response to a control signal generated by at least one of said circuits to be controlled;
- wherein each of said current limited switches includes a field effect transistor having a source terminal connected to a power bus which receives power from said power source, a drain terminal connected to one of said circuits to be controlled, and a gate terminal; a first resistor connected between said source and gate terminals; a second resistor connected between said gate terminal and said switch control circuit; and a capacitor connected between said gate terminal and either ground or a bus voltage.

2. A redundant power bus arrangement for electronic circuits, as recited in claim 1, wherein each of said current limited switches further comprises:
- a bipolar transistor having a collector connected to said second resistor, an emitter connected to ground, and a base connected to a third resistor.

3. A redundant power bus arrangement for electronic circuits, as recited in claim 1, wherein said switch control circuit comprises:
- a one shot circuit having a first output connected to the second resistor of said first current limited switch, a second output connected to the second resistor of said second current limited switch, a first input for receiving a control signal from said active circuit, and a second input for receiving a reset input signal; and
- means for controlling the duration of output pulses from said one shot circuit.

4. A redundant power bus arrangement for electronic circuits, as recited in claim 3, wherein said control signal comprises:
- a square wave voltage signal having a plurality of voltage pulses, with a period which is less than the duration of output pulses from said one shot circuit.

5. A redundant power bus arrangement for electronic circuits, as recited in claim 3, wherein said switch control circuit further comprises:
- a first level shifting component connected between said first output and said second resistor, of said first current limited switch; and
- a second level shifting component connected between said second output and said second resistor of said second current limited switch.

6. A redundant power bus arrangement for electronic circuits, as recited in claim 1, wherein said switch control circuit comprises:
- a first one shot circuit having a first output connected to the second resistor of said first current limited switch, and a first input for receiving a control signal from said standby circuit;
- means for controlling the duration of output pulses from said first one shot circuit;
- a second one shot circuit having a first output connected to the second resistor of said second current limited switch, and a first input for receiving a control signal from said active circuit; and
- means for controlling the duration of output pulses from said second one shot circuit.

7. A redundant power bus arrangement for electronic circuits, as recited in claim 6, wherein said control signal comprises:

a square wave voltage signal having a plurality of voltage pulses, with a period which is less than the duration of output pulses from said shot circuits.

8. A redundant power bus arrangement for electronic circuits, as recited in claim 1, wherein said switch control circuit comprises:

a first one shot circuit having a first output, a second output connected to the second resistor of said first current limited switch, a first input for receiving a control signal from said active circuit and a second input for receiving a reset signal;

means for controlling the duration of output pulses from said first one shot circuit;

a second one shot circuit having an output connected to the second resistor of said second current limited switch, a first input for receiving a control signal from said standby circuit, a second input, and a reset input for receiving said reset signal;

means for controlling the duration of output pulses from said second one shot circuit; and a capacitor connected between the first output of said first one shot circuit and the second input of said second one shot circuit.

9. A redundant power bus arrangement for electronic circuits, as recited in claim 8, wherein said control signal comprises:

a square wave voltage signal having a plurality of voltage pulses, with a period which is less than the duration of output pulses from said shot circuits.

* * * * *